US010449618B2

(12) United States Patent
Resch et al.

(10) Patent No.: US 10,449,618 B2
(45) Date of Patent: Oct. 22, 2019

(54) COUPLING STRUCTURE AND METHOD FOR FEEDING COMPRESSED AIR TO WELDING DEVICE USING SAME

(71) Applicant: Fronius International GmbH, Pettenbach (AT)

(72) Inventors: Christian Resch, Ruhstorf (DE); Manfred Bruckner, Kremsmuenster (AT); Anton Preundler, Gampern (AT); Stefan Platzer, Pettenbach (AT); Stefan Radinger, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 850 days.

(21) Appl. No.: 14/430,808

(22) PCT Filed: Sep. 11, 2013

(86) PCT No.: PCT/EP2013/068853
§ 371 (c)(1),
(2) Date: Mar. 24, 2015

(87) PCT Pub. No.: WO2014/048756
PCT Pub. Date: Apr. 3, 2014

(65) Prior Publication Data
US 2015/0251266 A1 Sep. 10, 2015

(30) Foreign Application Priority Data
Sep. 25, 2012 (AT) .............................. A 01044/2012

(51) Int. Cl.
B23K 9/32 (2006.01)
B23K 9/133 (2006.01)
F16K 31/06 (2006.01)

(52) U.S. Cl.
CPC ............ *B23K 9/323* (2013.01); *B23K 9/1336* (2013.01); *B23K 9/325* (2013.01); *B23K 9/328* (2013.01);
(Continued)

(58) Field of Classification Search
None
See application file for complete search history.

(56) References Cited

U.S. PATENT DOCUMENTS 3,086,593 A * 4/1963 Chitwood ............. E21B 43/123
137/155
3,133,475 A * 5/1964 Barkan ................... F15B 11/08
200/82 B (Continued)

FOREIGN PATENT DOCUMENTS

AT 500653 A1 2/2006
CN 102596480 A 7/2012
(Continued)

OTHER PUBLICATIONS

International Preliminary Report on Patentability for PCT International Application No. PCT/EP2013/068853 (dated Dec. 22, 2014).

(Continued)

*Primary Examiner* — Ibrahime A Abraham
*Assistant Examiner* — Gyounghyun Bae
(74) *Attorney, Agent, or Firm* — Jenkins, Wilson, Taylor & Hunt, P.A.

(57) ABSTRACT

Device and method for welding a workpiece (2) having a welding torch (3) which can be mechanically coupled by a coupling element (4) to a hose bundle (5) for supplying the welding torch (3) at least with compressed air or with a protective gas, wherein compressed air applied to the cou- (Continued)

pling element (4) can be diverted by a diverting valve (10) provided in the coupling element (4) for actuating an actuator (7).

11 Claims, 6 Drawing Sheets

(52) U.S. Cl.
CPC ......... *F16K 31/06* (2013.01); *Y10T 137/0318* (2015.04)

(56) References Cited

U.S. PATENT DOCUMENTS

| | | | | |
|---|---|---|---|---|
| 3,146,695 | A * | 9/1964 | Van De Bilt | B65B 13/02 100/26 |
| 3,203,248 | A * | 8/1965 | Stutler | G01N 30/06 422/83 |
| 3,414,197 | A * | 12/1968 | Proust | B23K 9/133 219/75 |
| 3,507,097 | A * | 4/1970 | Crowley | B01D 53/0438 137/625.69 |
| 3,518,891 | A * | 7/1970 | Denkowski | F16K 31/05 251/67 |
| 3,621,556 | A * | 11/1971 | Thierri | H01R 43/052 29/38.9 |
| 3,777,106 | A * | 12/1973 | Nuccel | B23K 25/005 219/161 |
| 3,841,000 | A | 10/1974 | Simon | |
| 3,860,782 | A * | 1/1975 | Hamby | B23K 11/0026 219/85.18 |
| 4,536,635 | A * | 8/1985 | Shook | B23K 11/3063 219/81 |
| 4,609,804 | A | 9/1986 | Kishi et al. | |
| 4,780,589 | A * | 10/1988 | Davies | B23K 11/3045 219/64 |
| 4,873,412 | A * | 10/1989 | Vinczer | B23K 9/206 219/136 |
| 5,399,837 | A | 3/1995 | Mangelsen et al. | |
| 5,609,782 | A * | 3/1997 | Kim | B23K 9/10 219/132 |
| 6,066,833 | A * | 5/2000 | Rigdon | B23K 9/133 219/137.2 |
| 6,166,349 | A * | 12/2000 | Williams | B23K 9/10 219/133 |
| 6,213,447 | B1 * | 4/2001 | Bircann | F16K 1/48 251/84 |
| 8,350,652 | B2 * | 1/2013 | Hoppe | F01L 1/3442 310/12.31 |
| 2002/0011470 | A1 * | 1/2002 | Domschot | B23K 11/115 219/86.8 |
| 2005/0224489 | A1 * | 10/2005 | Matiash | B23K 9/122 219/137.63 |

FOREIGN PATENT DOCUMENTS

| | | |
|---|---|---|
| DE | 1961617 U | 6/1967 |
| DE | 197 39 217 A1 | 3/1999 |
| DE | 20 2010 007364 U1 | 8/2010 |
| JP | H07 124748 A | 5/1995 |
| JP | H07 204857 A | 8/1995 |
| JP | 10-286676 A | 10/1998 |
| JP | 2000 246446 A | 9/2000 |
| WO | WO-2005/120760 A1 * | 12/2005 |
| WO | WO-2010/135752 A2 * | 12/2010 |

OTHER PUBLICATIONS

International Search Report for PCT International Application No. PCT/EP2013/068853 (dated Jun. 3, 2014).
Office Action for Chinese Patent Application No. 201380049648.1 (dated May 19, 2016).
Office Action for German Patent Application Serial No. 11 2013 004 700.4 (dated Nov. 30, 2018).

\* cited by examiner

COUPLING STRUCTURE AND METHOD FOR FEEDING COMPRESSED AIR TO WELDING DEVICE USING SAME

FIELD OF THE INVENTION

The invention relates to a welding device for arc welding of a workpiece.

BACKGROUND OF THE INVENTION

During arc welding, an arc is produced between a wire electrode and the workpiece to be welded. The workpiece is thus heated by the arc and the wire electrode is melted. The arc can be produced by application of a direct or alternating current. The electric arc between the wire electrode melting as an additional material and the workpiece is used as a heat source for welding purposes. The high temperature of the arc melts the material at the weld site. Welding current transformers with or without a welding rectifier, welding converter or welding inverter can be used as welding current sources. Depending on the application and electrode type, direct current or alternating current is supplied to the melting wire electrode. The melting of the wire electrode is compensated for by continuous replenishment so that the arc length remains constant.

In the case of gas-shielded metal-arc welding, GSMAW, a protective gas additionally protects the weld site against the effects of the surrounding atmospheric air. In particular, such a protective gas can prevent oxidation of the weld site. In gas-shielded metal-arc welding, GSMAW, a melting wire electrode is used as an additional material. In gas-shielded metal-arc welding a differentiation is made according to the type of gas used between a metal active gas, MAG, and metal inert gas, MIG, welding process. The protective gas protects the liquid metal below the arc from oxidation, whereby the weld seam on the workpiece would be weakened.

During metal active gas welding, MAG, the welding process is carried out either with pure carbon dioxide or with a mixed gas of argon and small proportions of carbon monoxide or oxygen. During metal inert gas welding, MIG, argon is used as a noble gas, or more rarely even the noble gas helium is used. During gas-shielded metal-arc welding, GSMAW, i.e. with the MAG method or MIG method, an arc is produced between the wire electrode or the welding wire and the workpiece.

In conventional welding apparatuses the wire electrode or the welding wire is supplied to the workpiece via a wire feed device. The resistance heating and arc heating melts the supplied welding wire. The material melted at the wire electrode passes as a droplet onto the workpiece and at that location melts to form the weld seam. The protective gas flows out of a nozzle surrounding the wire electrode or the welding wire and thus protects the arc and the melt bath against surrounding atmospheric air.

In conventional welding apparatuses, compressed air can additionally be supplied via a compressed air line from a source of compressed air to the welding torch of the welding apparatus. With the aid of this compressed air, welding residues produced during welding can be blown away or the weld site can be cleaned with the aid of compressed air.

In conventional welding apparatuses it is necessary, under certain operating conditions, to axially fix the supplied welding wire, which is unwound from a supply spool and is conventionally conveyed via a guide hose, with respect to its guide. The welding wire is in that case held by a welding wire clamping device so that the torch-side end of the welding wire cannot be axially displaced with respect to the welding torch.

In conventional welding apparatuses such an actuator, e.g. the welding wire clamping device, is actuated by a separate motor or drive device. In this drive device for the actuator, power in the form of electric current is generally supplied via current supply lines. In the case of conventional welding apparatuses, the complexity thereof is increased by the provision of drive devices for internal actuators, e.g. a welding wire clamping device. Furthermore, in conventional welding apparatuses it is not possible to attach external actuators, which are provided e.g. for operating a tool, to the welding apparatus.

BRIEF SUMMARY OF THE INVENTION

An object of the present invention is therefore to create a welding device in which, without increasing the technical complexity of the welding device, internal and/or external actuators can be additionally actuated.

This object is achieved in accordance with the invention by a welding device having the features stated in claim 1.

The invention accordingly creates a welding device for welding a workpiece having a welding torch which can be mechanically coupled by a coupling element to a hose bundle for supplying the welding torch at least with compressed air or with a protective gas, wherein compressed air applied to the coupling element can be diverted by a diverting valve provided in the coupling element for actuating an actuator.

In one possible embodiment of the welding device in accordance with the invention, the diverting valve provided in the coupling element can be switched over between two valve positions by a controllable electromagnet.

Thus, in a first valve position of the diverting valve, the compressed air applied to the coupling element is fed to the welding torch.

Furthermore, in the second valve position of the diverting valve, the compressed air applied to the coupling element is diverted to the actuator.

In a further possible embodiment of the welding device in accordance with the invention, the coupling element has a gas spigot for attachment to the hose bundle of the welding device.

In one possible embodiment, the gas spigot of the coupling element is connected to a gas switch-over valve which can be actuated and which can be switched over between a compressed air source and a protective gas source for supplying the welding torch with compressed air or protective gas.

In a further possible embodiment of the welding device in accordance with the invention, during welding operation of the welding device, the gas switch-over valve is switched in such a way that protective gas from the protective gas source is applied to the gas spigot of the coupling element through a line of the hose bundle, and the diverting valve within the coupling element is switched to the first valve position.

In one possible embodiment of the welding device in accordance with the invention, during blow-out operation of the welding device, the gas switch-over valve is switched in such a way that compressed air from the compressed air source is applied to the gas spigot of the coupling element through a line of the hose bundle, and the diverting valve within the coupling element is switched to the first valve position. In a further possible embodiment of the welding device in accordance with the invention, during actuator-actuating operation of the welding device, the gas switch-over valve is switched in such a way that compressed air from the compressed air source is applied to the gas spigot of the coupling element through a line of the hose bundle, and the switch-over valve within the coupling element is switched to the second valve position such that the applied compressed air is diverted to actuate the actuator within or outside the coupling element.

In one possible embodiment of the welding device in accordance with the invention, the actuator actuated with the aid of the compressed air diverted during actuator-actuating operation of the welding device is a welding wire stop which is provided to clamp the welding wire supplied in a welding wire guide.

In one possible embodiment of the welding device in accordance with the invention, the compressed air diverted during actuator-actuating operation of the welding device is diverted to an actuator through a bore provided in the housing of the coupling element.

In a further possible embodiment of the welding device in accordance with the invention, an integrated valve control is provided in the coupling element for controlling the electromagnet of the diverting valve.

In one possible embodiment of the welding device in accordance with the invention, the integrated valve control for diverting the compressed air during actuator-actuating operation of the welding device activates the electromagnet provided in the coupling element.

In one possible embodiment of the welding device in accordance with the invention, by means of the activated electromagnet a mechanical latching component is released and the diverting valve is moved from the first valve position to the second valve position for diverting the compressed air to the actuator.

In one possible embodiment of the welding device in accordance with the invention, the mechanical latching component is a ball.

In one possible embodiment of the welding device in accordance with the invention, when the diverting valve is in the first valve position, this ball engages with an annular recess in an outer surface of a hollow cylindrical control slide of the diverting valve and is thus fixed by the armature.

In this way, during welding operation of the welding device, the applied protective gas and, during blow-out operation of the welding device, the applied compressed air pass through the hollow control slide via an opening provided in the control slide to the welding torch of the welding device.

In one possible embodiment of the welding device in accordance with the invention, during activation of the electromagnet of the diverting valve for transfer into actuator-actuating operation of the welding device, the ball falls into an annular groove in a movable armature of the electromagnet.

This ensures that the ball no longer engages with the annular recess in the outer surface of the hollow cylindrical control slide, and the hollow cylindrical control slide of the diverting valve is moved by the pressure of the compressed air from the first valve position to the second valve position of the diverting valve for diverting the compressed air to the actuator.

In one possible embodiment of the welding device in accordance with the invention, the valve control integrated in the coupling element is connected to a control.

The invention also creates a method having the features given in claim 13.

The invention accordingly creates a method for providing compressed air for an actuator, wherein compressed air applied to a welding torch via a mechanical coupling element is diverted to the actuator by activation of a diverting valve provided in the mechanical coupling element.

BRIEF DESCRIPTION OF THE SEVERAL DRAWINGS

Possible embodiments of the welding device in accordance with the invention and of the method in accordance with the invention for providing compressed air for an actuator are explained in more detail hereinunder with reference to the attached figures in which.

DETAILED DESCRIPTION OF THE INVENTION

Figure 1:
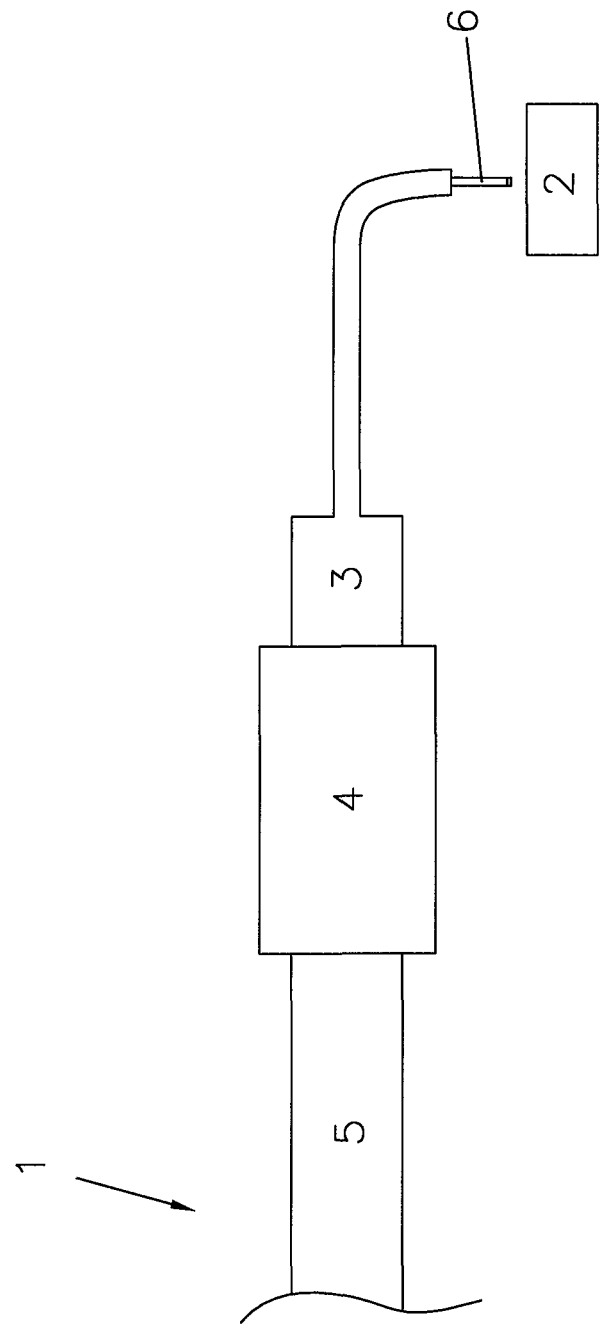
FIG. 1 shows a schematic view to illustrate an exemplified embodiment of a welding device in accordance with the invention for welding a workpiece.

As shown in FIG. 1, a welding device 1 in accordance with the invention for welding a workpiece 2 has a welding torch 3 which can be mechanically coupled via a coupling element 4 to a hose bundle 5 for supplying the welding torch 3 with compressed air and/or with a protective gas.

The hose bundle 5 illustrated in FIG. 1 can be attached to a welding robot which guides the welding torch 3. Furthermore, the welding torch 3 is supplied with electric current or electric power via the hose bundle 5 and the coupling element 4, which leads to an arc which, during welding, is formed between a welding wire electrode 6 and the workpiece 2 to be welded. The electric current supplied can be direct current or alternating current. This electric current is supplied to the welding wire 6 via the hose bundle 5 and the coupling element 4, whereby an arc is produced between the welding torch 3 and the workpiece 2. The workpiece 2 is heated and melted by the arc which is produced by application of the direct or alternating current. The material melted at the wire electrode or welding wire 6 passes as a droplet onto the workpiece 2 and melts at that location to form a weld seam.

The welding device 1 in accordance with the invention can switch over between different types of operation or modes of operation. In one possible embodiment of the welding device 1 in accordance with the invention, the welding device 1 can be switched over between welding operation and blow-out operation and actuator-actuating operation. In welding operation of the welding device 1, in addition to the electric current, the gas from a protective gas source is additionally applied to a gas spigot 8 of the coupling element 4 through a line of the hose bundle 5 and passes through the coupling element 4 to the distal end of the welding torch 3. At the distal end of the welding torch 3, the protective gas exits at a nozzle and, in addition to the arc, also encloses the molten material located below the arc, wherein it is particularly protected against oxidation. The protective gas is drawn from a protective gas source in which protective gas is kept at a pressure of e.g. 1 to 2 bar. The protective gas can be e.g. argon or helium or a mixture of these two noble gasses, wherein this is generally known from the prior art.

The welding apparatus in accordance with the invention or the welding device 1 in accordance with the invention as shown in FIG. 1 is essentially suitable for all welding methods known from the prior art, such as MIG/MAG, TIG or plasma welding. A welding plant which uses the welding device 1 in accordance with the invention, as shown in FIG. 1, preferably has a current source which can be switched over between direct and alternating current operation. The welding torch 3 is attached to a current source via the hose bundle 5 with the aid of the coupling element 4. If the current source has an external wire feed, the hose bundle is attached to the wire feed, the hose bundle being correspondingly connected to the current source. At least the welding current line, the protective gas supply, the welding wire guide and the control lines are located in the hose bundle 5. In the case of a larger welding torch 3, an inlet and return line for cooling water can also be provided in the hose bundle 5.

In the various welding methods, welding residues can be produced which can be removed with the aid of the compressed air applied via the hose bundle 5 during blow-out operation of the welding device 1. The welding device 1 in accordance with the invention can be switched over from welding operation to blow-out operation. In one possible embodiment of the welding device 1 in accordance with the invention, the coupling element 4 and a diverting valve 10 provided therein can be switched over between two valve positions via a controllable electromagnet. In a first valve position of the diverting valve 10, the compressed air applied to the coupling element 4 is fed to the welding torch 3. In this valve position, the compressed air carried through exits at the distal end of the welding torch 3 and removes dirt in the interior of the gas nozzle. In the second valve position of the diverting valve 10, the compressed air applied to the coupling element 4 is diverted to an actuator 7. The actuator 7 can be e.g. an actuator integrated in the coupling element 4, e.g. a welding wire brake or welding wire clamp (FIG. 2).

Figure 2:
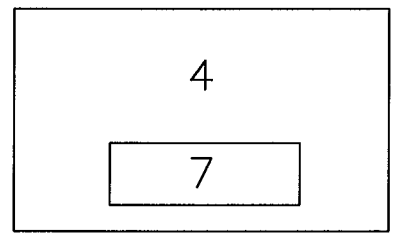
FIG. 2 shows a possible embodiment of a welding device in accordance with the invention having an actuator integrated in a coupling element.
Figure 3:
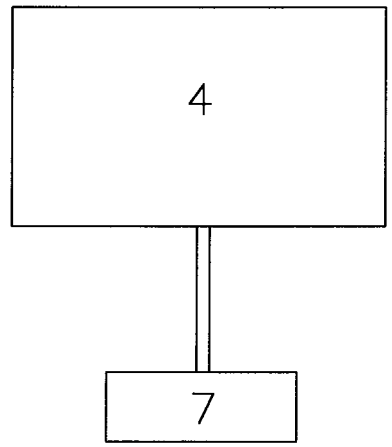
FIG. 3 shows a further exemplified embodiment of a welding device in accordance with the invention having an actuator attached to a coupling element.

FIGS. 2 and 3 illustrate different embodiments of the welding device 1 in accordance with the invention in which the actuated actuator 7 is located either within the coupling element 4, as shown in FIG. 2, or is attached to the coupling element 4 via a compressed air line, as shown in FIG. 3. The actuator 7 shown in FIG. 2 can be e.g. a welding wire stop provided in the coupling element 4. The actuator 7 shown in FIG. 3 and attached to the coupling element 4 can be e.g. a compressed air-operated tool such as a grinding machine, a tool for seam post-treatment or the like, which can be used particularly after a welding process.

Figure 4:
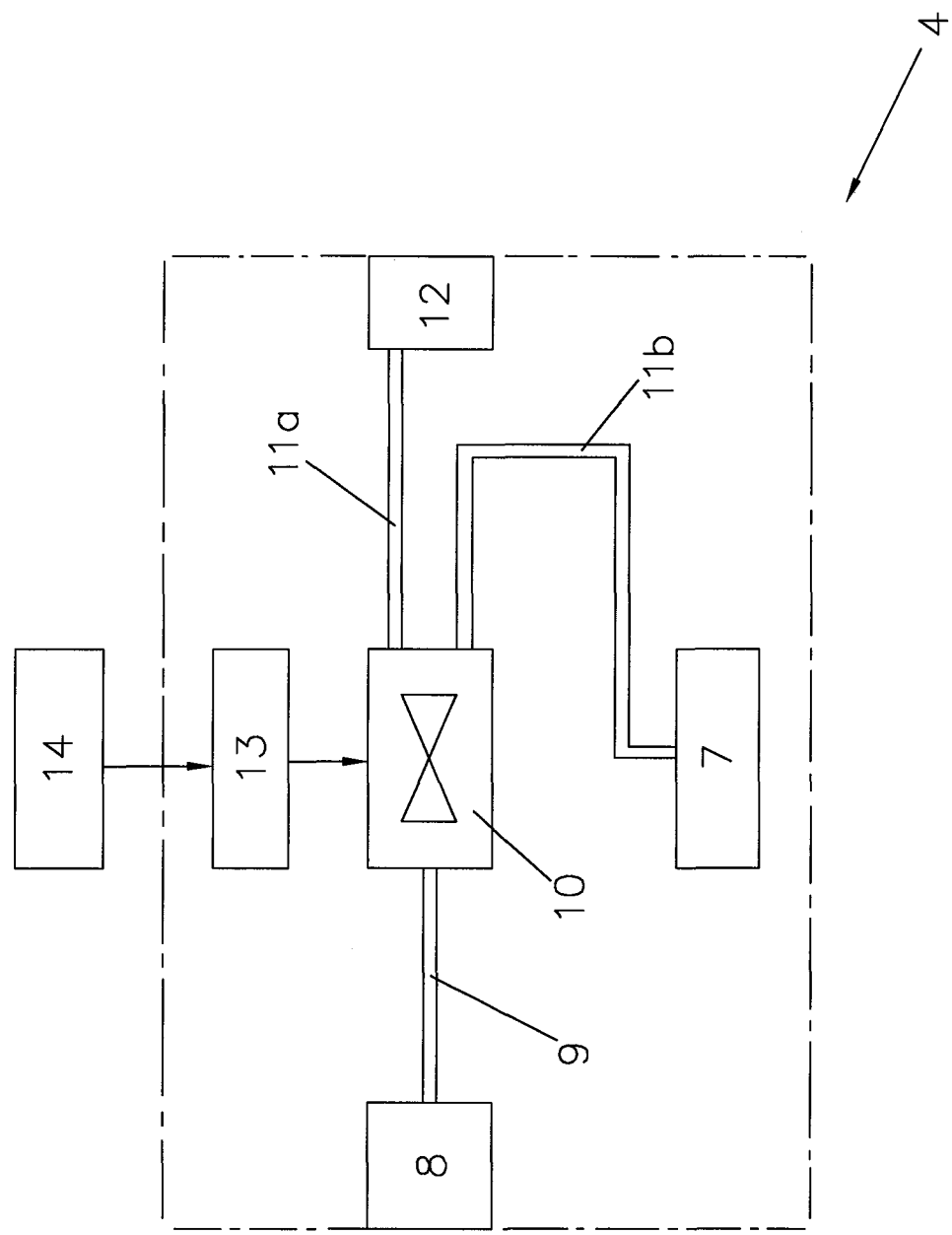
FIG. 4 shows a block diagram to illustrate an exemplified embodiment of the coupling element provided in the welding device in accordance with the invention.

FIG. 4 shows an exemplified embodiment of a coupling element 4 used in the welding device 1 in accordance with the invention. The coupling element 4, as shown in FIG. 4, serves for mechanical coupling of the welding torch 3 to the hose bundle 5. For attachment to the hose bundle 5 the coupling element 4 has a gas spigot 8. This gas spigot 8 of the coupling element 4 can be connected to a gas switch-over valve which can be actuated and which can be switched over e.g. within the hose bundle 5 between a compressed air source and a protective gas source to supply the welding torch 3 with compressed air or protective gas. The gas spigot 8 supplies the applied gas via a line 9 within the coupling element 4 to a diverting valve 10 integrated therein. In one possible embodiment, the diverting valve 10 has a controllable electromagnet which can be switched over between two valve positions. In the first valve position of the diverting valve 10, the compressed air applied to the coupling element 4 is fed from the gas spigot 8 via the gas line 9 and an internal gas line 11*a* to a gas outlet 12 of the coupling element 4. In a second valve position of the diverting valve 10, the compressed air applied to the coupling element 4 at the gas spigot 8 is applied to the actuator 7 via an internal compressed air line 11*b*. As shown in FIG. 4, the coupling element 4 also has an integrated valve control 13 which is provided to control the electromagnet of the diverting valve 10. In order to divert the compressed air in actuator-actuating operation of the welding device 1, the integrated valve control 13 activates the electromagnet provided in the coupling element 4 such that the diverting valve 10 is moved from the first valve position to the second valve position during actuator-actuating operation and the applied compressed air is applied to the actuator 7 via the compressed air line 11*b*. The valve control 13 integrated in the coupling element 4 of the welding device 1 can be connected e.g. via the hose bundle 5 to a control 14 of the current source.

Figure 5:
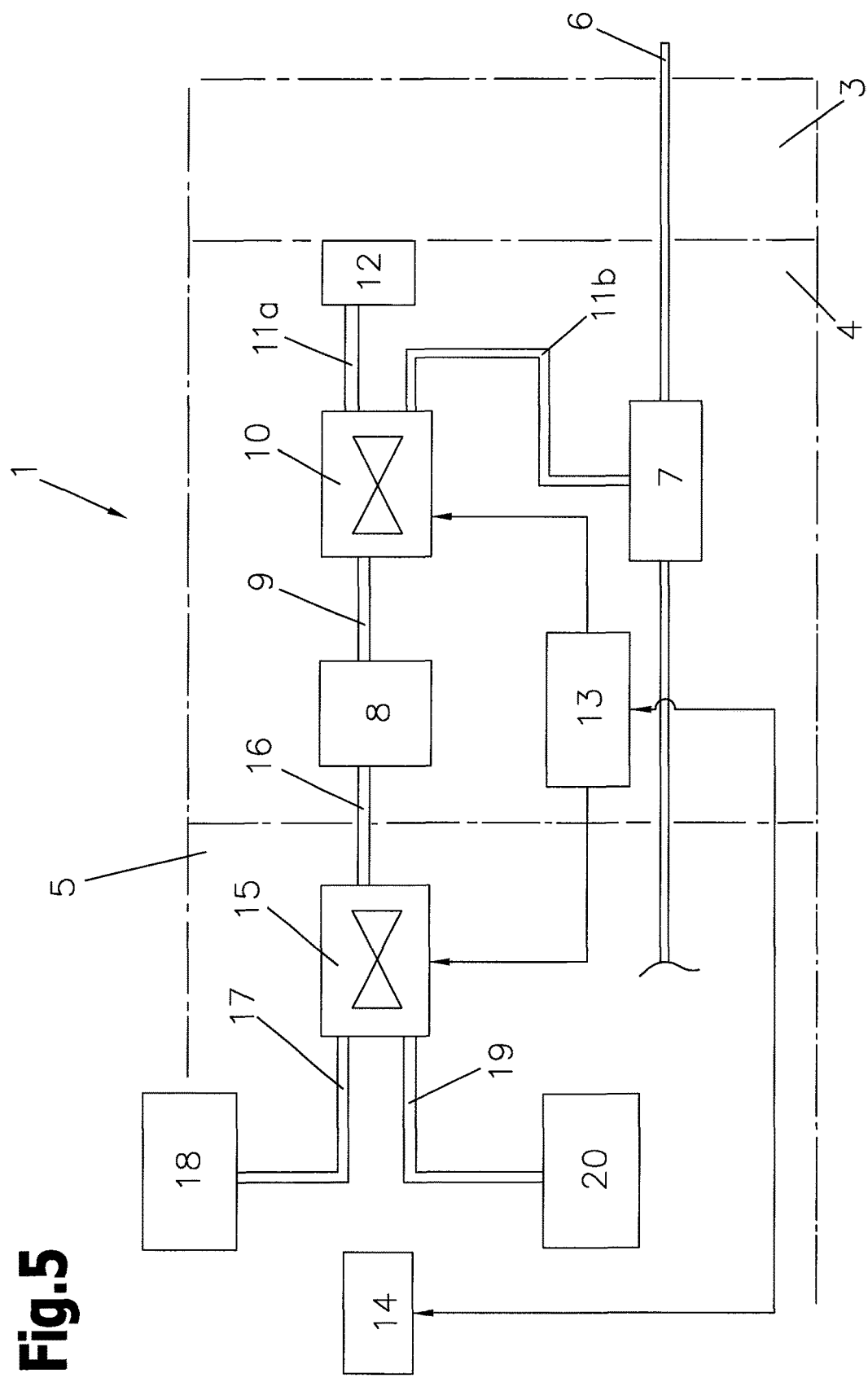
FIG. 5 shows a further block diagram to illustrate an exemplified embodiment of the welding device in accordance with the invention.

FIG. 5 shows a further exemplified embodiment of a welding device 1 in accordance with the invention. In the exemplified embodiment shown in FIG. 5, the valve control 13 contained in the coupling element 4 controls not only the diverting valve 10 but also the gas switch-over valve 15 which is provided in the hose bundle 5 at the transition to the coupling element 4. The gas switch-over valve 15 is connected on the outlet side to the gas spigot 8 of the coupling element 4 via a gas line 16. On the inlet side, the gas switch-over valve 15 is attached to a protective gas source 18 via a gas line 17 and is connected to a compressed air source 20 via a gas line 19. In an alternative embodiment, the external control 14 controls the gas switch-over valve 15 directly. The external control 14 can be located e.g. in an apparatus which also contains a current source which supplies an alternating or direct current to generate the arc. In one possible embodiment, the current generated is fed via the hose bundle 5 by means of a current line extending therein and is fed further via the housing of the coupling element 4 to the welding torch 3. The external control 14 preferably has a microprocessor and carries out a welding programme, wherein the welding program switches over the welding device 1 in accordance with the invention between welding operation, blow-out operation and actuator-actuating operation. In actuator-actuating operation, e.g. a welding wire brake or a welding wire clamp for clamping the welding wire 6 is actuated. In an alternative embodiment, the gas switch-over valve 15 can also be formed mechanically and can be disposed in the wire feed.

During actuator-actuating operation, the compressed air issuing from the compressed air source 20 passes via the lines 19 and the gas switch-over valve 15, via the gas line 16, the gas spigot 8, via the internal line 9 to the diverting valve 10 where it is diverted via the integrated compressed air line 11*d* to the actuator 7. The diverting valve 10 is thus located in the air position—i.e. the spring is compressed—in which the electromagnet has been actuated.

During welding operation of the welding device 1, the protective gas issuing from the protective gas source 18 is fed through the gas line 17, via the gas switch-over valve 15 and via the gas line 16, via the gas spigot 8 and the internal line 9 and passes via the diverting valve 10 correspondingly switched to the gas position, via the line 11a to the gas outlet 12 of the coupling element 4 and from there to the welding torch 3.

During blow-out operation of the welding device 1, the compressed air issuing from the compressed air source 20 passes via the gas line 19, and the gas switch-over valve 15, via the gas line 16, the gas spigot 8, via the internal gas line 9 to the diverting valve 10 switched to the gas position where it is fed via the line 11a to the gas outlet 12 of the coupling element 4. From the gas outlet 12, the compressed air is output to the welding torch 3 and, at the distal end of the welding torch 3, removes welding residues which are produced during welding.

During welding operation and blow-out operation, the diverting valve 10 is in the same position. The gas position is thus the inoperative position in which the diverting valve 10 is located when no controlling is taking place.

Figure 6:
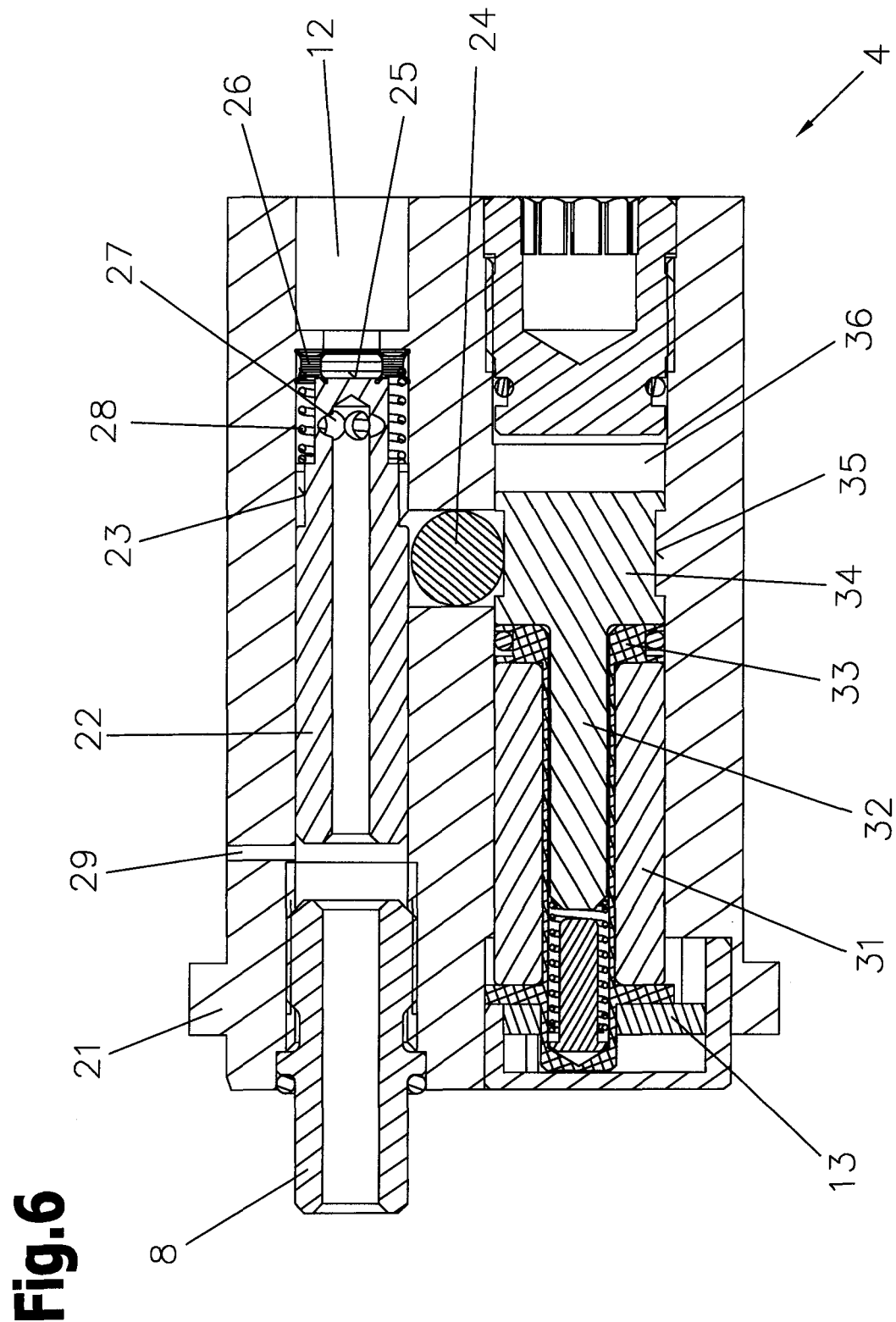
FIG. 6 shows a sectional view through a coupling element as can be used in the welding device in accordance with the invention.

FIG. 6 shows an exemplified implementation or exemplified embodiment of a welding device 1 in accordance with the invention having a coupling element 4 in which the diverting valve 10 is contained. FIG. 6 shows the gas spigot 8 which is fixedly anchored in a housing 21 of the coupling element 4 and is screwed into the housing 21 e.g. with the aid of a thread. The gas spigot 8 has a bore which can be attached at the inlet side to the gas line 16 of the hose bundle 5. This bore in the gas spigot 8 is connected to a bore in a hollow control slide 22 which is displaceably disposed in an recess in the housing 21. The hollow control slide 22 is cylindrical and, in the exemplified implementation shown in FIG. 6, has an annular recess 23 in an outer surface, with which recess a ball 24 can engage as a mechanical latching component.

In the position shown in FIG. 6, the ball 24 does not engage with the annular recess 23 which is provided in the outer surface of the hollow cylindrical control slide 22. In the position illustrated in FIG. 6, the end 25 lies with the recess 23 of the hollow control slide 22 against a seal 26 such that, when the control slide 22 is in the illustrated position, the gas provided in the bore in the hollow control slide 22, in particular compressed air, cannot pass via a lateral bore 27 in the control slide 22 to the outlet 12 of the coupling element 4. FIG. 6 also shows a return spring 28 which is provided at the end of the control slide 22 and is compressed in FIG. 6 by reason of the pressure of the compressed air. In the exemplified embodiment illustrated in FIG. 6, there is a transverse bore 29 in the housing 21 of the coupling element 4, via which bore, compressed air, which is located in the bore in the hollow control slide 22, can, in the case of the position shown in FIG. 6, pass laterally outwards and be supplied to an actuator 7 via a compressed air line. If the actuator 7 is external, it can operate e.g. a tool which is located in the proximity of the welding device 1. In the exemplified embodiment shown in FIG. 6, only one transverse bore 29 is provided to which, by means of a compressed air line, an actuator 7 in the coupling element 4 can be attached. In alternative embodiments, a plurality of transverse bores can also be provided in order to be able to attach a plurality of actuators 7 to the coupling element 4 of the welding device 1. The control is in this case carried out accordingly via the control 14 and/or the valve control 13.

In the exemplified implementation shown in FIG. 6, the valve control 13 is located on a printed circuit board integrated in the coupling element 4 and controls an electromagnet 30. The electromagnet 30 has a magnet coil 31 which surrounds an armature 32. The electromagnet 30 can be embedded in a coil housing 33. The moveable armature 32 has a moveable cylindrical body which, as shown in FIG. 6, has a widened armature head 34. An annular recess 35 is provided in the armature head 34, into which recess the ball 24 latches during actuator-actuating operation. The end of the armature 32 closest to the coil housing 33 thus fixes the ball 24 in the recess 23 in the control slide 22. If this is the case, the switch-over valve 10 is located in the first valve position. The armature 32 with its head 34 is laterally moveable in a hollow space 36 within the housing 21 of the coupling element 4 and is thus moveable in the same direction as the control slide 22. Thus a stop for the armature 32 can be set by a threaded pin such that the position can be adjusted for fixing the ball 24. The integrated valve control 13 attached to the electromagnet 30 serves to control the electromagnet 30 of the diverting valve 10. By the diversion of the compressed air in actuator-actuating operation of the welding device 1 the electromagnet 30 provided in the coupling element 4 is activated such that the mechanical latching component 24, e.g. the ball 24, is released, the diverting valve 10 is moved from a first valve position to a second valve position to divert the compressed air to the actuator 7 and the control slide 22 is moved to the illustrated position.

FIG. 6 shows a hollow control slide 22 of the diverting valve 10 in the second valve position with the ball 24 unlatched to divert the compressed air via the transverse bore 29 to the external actuator 7. Thus, when the control slide 22 has been moved to the illustrated position, the transverse bore 29 is released.

The ball 24 is latched in the other first valve position of the diverting valve 10 of the annular recess 23 in an outer surface of the hollow cylindrical control slide 22 of the diverting valve such that the gas applied to the gas spigot 8 passes via the bore within the hollow control slide 22, via the lateral radial bore 27 in the control slide 22, past the return spring 28, through the seal 26 to the outlet opening 12 in the coupling element 4.

Figure 7:
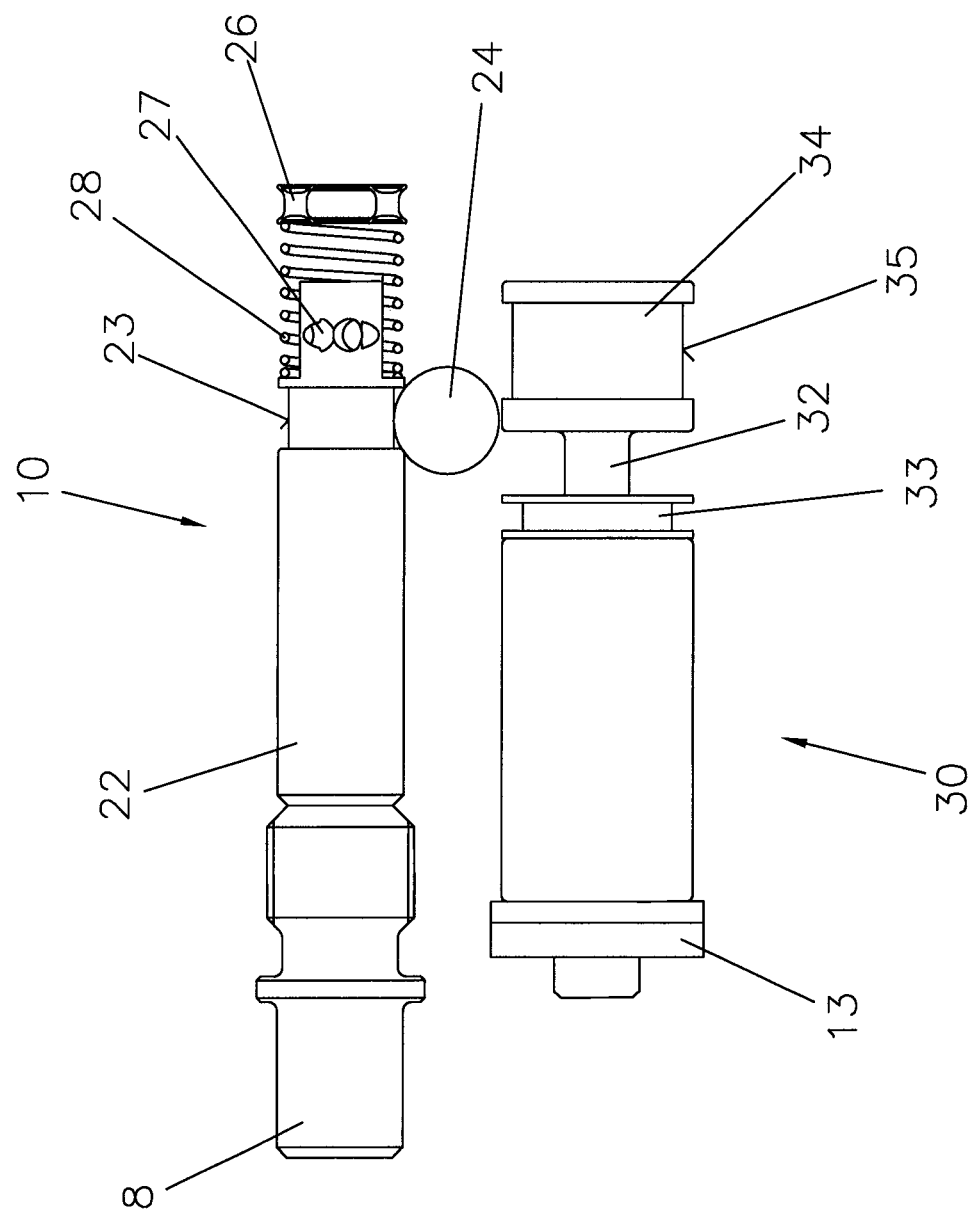
FIG. 7 shows a perspective view to explain the manner of operation of the coupling element illustrated in FIG. 6.

FIG. 7 shows the diverting valve 10 in the first valve position in which the gas applied to the gas spigot 8, e.g. protective gas or compressed air, passes through the hollow control slide 22, through the radial bore 27 outwards into a chamber or recess within the housing 21 of the coupling element 4, which chamber or recess is formed by the retracted hollow control slide 22. From that location, the gas passes through the seal 26 to the outlet opening 12 of the coupling element 4 and from there to the welding torch 3 of the welding device 1. During welding operation of the welding device 1 the gas fed through is a protective gas. During blow-out operation of the welding device 1 the gas fed through is compressed air. FIG. 7 shows the ball 24 which engages with the annular recess 23 in an outer surface of the cylindrical control slide 22 and holds the control slide 22 of the diverting valve 10 in the first valve position of the diverting valve 10. On its other side, the ball 24 is not located in the recess 35 which is provided in the head 34 of the armature 32. The ball 24 may consist e.g. of metal. By activation of the electromagnet 30 of the diverting valve 10, for the transition to actuator-actuating operation of the welding device 1, the ball 24 falls into the annular groove 35 in the moveable armature 32. In this way, the ball 24 no longer engages with the annular recess 23 in the outer surface of the hollow cylindrical control slide 22 and the hollow cylindrical control slide 22 is moved by pressure of the compressed air from the first valve position to the second valve position of the diverting valve 10 to divert the compressed air to the actuator 7. This second valve position of the diverting valve 10 is shown in FIG. 6.

In the second valve position, the applied gas, in particular the compressed air, is diverted to an actuator 7. The diverted gas can operate e.g. any tools within a workshop and replace other drive mechanisms. The compressed air source 20 preferably makes compressed air available at a high pressure of e.g. 5 to 16 bar.

In the first valve position which is shown in FIG. 7 and depicts the basic or gas position, activation of the electromagnet 30 causes the diverting valve or deflecting valve 10 to be moved to the second valve position shown in FIG. 6 and the applied compressed air to be diverted or deflected to the actuator 7. The electromagnet 30 is preferably actuated only briefly and after a certain time delay of e.g. 0.5 seconds, the compressed air is applied to actuate the actuator 7. In this position, the control slide 22 presses against the seal 26 such that in this position no compressed air reaches the welding torch 3. After switching over to actuator-actuating operation, i.e. to the position of the diverting valve 10 shown in FIG. 6, the electromagnet 30 can be deactivated and the applied compressed air holds the hollow control slide 22 in the second valve position shown in FIG. 6. In one possible embodiment, the diverted or deflected compressed air can also be deflected to an internal actuator 7, e.g. a welding wire clamp, as shown schematically in FIG. 5. The deflected compressed air can also be used for an automated torch change in a welding plant. Furthermore, the deflected compressed air can be used to open or close a coupling of an apparatus. By means of the valve control 13, in blow-out operation of the welding device 1, a blow-out pressure of up to 16 bar can be set. The coupling element 4 of the welding device 1 in accordance with the invention can be used in conventional welding devices such that simple refitting or retrofitting of existing welding devices is possible.

Further design variations of the welding device 1 in accordance with the invention are possible. For example, the valve position of the diverting valve 10 can be displayed to an operator. Furthermore, e.g. during mechanical attachment of an external actuator 7, a switch over to actuator-actuating operation can be effected automatically. In one possible design variation, the attachment of an external actuator 7 is detected by sensors and signalled to the valve control 13 which then moves the diverting valve 10 to divert the compressed air to the actuator 7.

In a possible embodiment, during welding operation, electric current is directed via the housing 21 of the coupling element 4. In an alternative embodiment, the coupling element 4 has additionally integrated current lines to forward the electric current to the welding torch 3. In a further design variation, the coupling element 4 may additionally have lines for the conveying of cooling water in the housing 21.

The invention claimed is:

1. A coupling structure of a welding device (1) for welding a workpiece (2) having a welding torch (3), a coupling element (4) and a welding wire stop (7), wherein the welding torch (3) is mechanically coupled by the coupling element (4) to a hose bundle (5) for supplying the welding torch (3) at least with compressed air or with a protective gas, wherein the compressed air applied to the coupling element (4) is diverted by a diverting valve (10) provided in the coupling element (4) for actuating the welding wire stop (7), said welding wire stop (7) being adapted to clamp a welding wire (6) supplied in the welding wire guide and wherein the diverting valve (10) provided in the coupling element (4) is switchable between two valve positions by a controllable electromagnet (30), wherein in a first valve position of the diverting valve (10) the compressed air applied to the coupling element (4) is fed to the welding torch (3), and wherein in a second valve position of the diverting valve (10), the compressed air applied to the coupling element (4) is diverted to the welding wire stop (7) within the coupling element (4), wherein the controllable electromagnet (30) is activated such that a mechanical latching component (24) engagable with an annular recess (23) in an outer surface of a hollow cylindrical control slide (22) of the diverting valve (10) is released and the diverting valve (10) is moved from the first valve position to the second valve position to divert the compressed air.

2. The coupling structure as claimed in claim 1, wherein the coupling element (4) of the welding device (1) has a gas spigot (8) for attachment to the hose bundle (5) of the welding device (1), wherein the gas spigot (8) is connected to a gas switch-over valve (15) which can be actuated and which can be switched over between a compressed air source (20) and a protective gas source (18) for supplying the welding torch (3) with compressed air or protective gas.

3. The coupling structure as claimed in claim 2, wherein, during welding operation of the welding device (1), the gas switch-over valve (15) is switched in such a way that protective gas from the protective gas source (18) is applied to the gas spigot (8) of the coupling element (4) through a line (16) of the hose bundle (5), and the diverting valve (10) within the coupling element (4) is switched to the first valve position.

4. The coupling structure as claimed in any one of the preceding claim 2 or 3, wherein, during blow-out operation of the welding device (1), the gas switch-over valve (15) is switched in such a way that compressed air from the compressed air source (20) is applied to the gas spigot (8) of the coupling element (4) through a line (16) of the hose bundle (5), and the diverting valve (10) within the coupling element (4) is switched to the first valve position.

5. The coupling structure as claimed in any one of the preceding claim 2 or 3, wherein, during actuator-actuating operation of the welding device (1), the gas switch-over valve (15) is switched in such a way that compressed air from the compressed air source (20) is applied to the gas spigot (8) of the coupling element (4) through a line of the hose bundle (5), and the switch-over valve (10) within the coupling element (4) is switched to the second valve position, wherein the applied compressed air is diverted to actuate the welding wire stop within the coupling element (4).

6. The coupling structure as claimed in claim 5, wherein the compressed air diverted during actuator-actuating operation of the welding device (1) is diverted to the welding wire stop within the coupling element (4) through a bore (29) in the housing (21) of the coupling element (4).

7. The coupling structure as claimed in any one of the preceding claims 1 to 3, wherein an integrated valve control (13) is provided in the coupling element (4) for controlling the electromagnet (30) of the diverting valve (10), wherein the integrated valve control (13) for diverting the compressed air during actuator-actuating operation of the welding device (1) activates the electromagnet (30) provided in the coupling element (4) such that the mechanical latching component (24) is released and the diverting valve (10) is moved from the first valve position to the second valve position to divert the compressed air.

8. The coupling structure as claimed in claim 7, wherein the mechanical latching component (24) is a ball which, when the diverting valve (10) is in the first valve position, engages with the annular recess (23) in an outer surface of the hollow cylindrical control slide (22) of the diverting valve (10) and is fixed by a movable armature (32) which is connected to the gas spigot (8) of the coupling element (4) such that, during welding operation of the welding device (1), the applied protective gas and, during blow-out operation of the welding device (1), the applied compressed air pass through the hollow cylindrical control slide (22) via an opening (27) provided in the hollow cylindrical control slide (22) and an outlet opening (12) to the welding torch (3) of the welding device (1).

9. The coupling structure as claimed in claim 8, wherein, during activation of the electromagnet (30) of the diverting valve (10) for a transition to actuator-actuating operation of the welding device (1), the ball (24) falls into an annular groove (35) in a cylinder head (34) of the movable armature (32) of the electromagnet (30) such that the ball (24) no longer engages with the annular recess (23) in the outer surface of the hollow cylindrical control slide (22), and the hollow cylindrical control slide (22) of the diverting valve (10) is moved by the pressure of the compressed air from the first valve position to the second valve position of the diverting valve (10) for diverting the compressed air.

10. The coupling structure as claimed in any one of the preceding claims 1 to 3, wherein a valve control (13) integrated in the coupling element (4) is connected to a control (14).

11. Method for welding a workpiece (2) by means of a welding torch (3), comprising the steps of:

mechanically coupling the welding torch (3) by a coupling element (4) to a hose bundle (5) for supplying the welding torch (2) at least with compressed air or with a protective gas;

guiding compressed air applied to the coupling element (4) by controlling a controllable electromagnet (30) to switch a diverting valve (10) between first and second valve positions, wherein, in the first valve position, the compressed air is fed to a gas outlet (12) of the coupling element (4) and, in the second valve position, the compressed air is fed to a welding wire stop (7) within the coupling element (4);

wherein controlling the controllable electromagnet (30) includes activating the controllable electromagnet (30) such that a mechanical latching component (24) engagable with an annular recess (23) in an outer surface of a hollow cylindrical control slide (22) of the diverting valve (10) is released and the diverting valve (10) is moved from the first valve position to the second valve position to feed the compressed air to the welding wire stop (7);

clamping a welding wire (6) supplied in a welding wire guide using the welding wire stop (7) when the diverting valve (10) is in the second valve position; and using the compressed air applied to the coupling element to the welding torch (3) for removal of welding residues when the diverting valve (10) is in the first valve position.

* * * * *